United States Patent
Saito (10) Patent No.: US 8,088,522 B2
(45) Date of Patent: Jan. 3, 2012

(54) FUEL CELL SYSTEM AND MOBILE BODY

(75) Inventor: Tomohiro Saito, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 450 days.

(21) Appl. No.: 12/439,397

(22) PCT Filed: Aug. 30, 2007

(86) PCT No.: PCT/JP2007/067352
§ 371 (c)(1),
(2), (4) Date: Feb. 27, 2009

(87) PCT Pub. No.: WO2008/029862
PCT Pub. Date: Mar. 13, 2008

(65) Prior Publication Data
US 2010/0009225 A1    Jan. 14, 2010

(30) Foreign Application Priority Data

Sep. 1, 2006  (JP) ................................. 2006-238140

(51) Int. Cl.
H01M 8/04  (2006.01)
(52) U.S. Cl. ....................................................... 429/428
(58) Field of Classification Search .............. 429/9, 428, 429/430; 180/65.31; H01M 8/04
See application file for complete search history.

(56) References Cited

U.S. PATENT DOCUMENTS

| | | |
|---|---|---|
| 6,777,909 B1 | 8/2004 | Aberle et al. |
| 2006/0055246 A1 | 3/2006 | Jansen et al. |
| 2009/0110970 A1* | 4/2009 | Tejima ............................ 429/13 |

FOREIGN PATENT DOCUMENTS

| | | |
|---|---|---|
| DE | 19950008 A1 | 4/2001 |
| DE | 19954306 B4 | 7/2001 |
| JP | H08-138711 A | 5/1996 |
| JP | H08-214452 A | 8/1996 |
| JP | H08-214453 A | 8/1996 |
| JP | H09-231991 A | 9/1997 |
| JP | 2001-088586 A | 4/2001 |
| JP | 2002-216783 A | 8/2002 |
| JP | 2002-313388 A | 10/2002 |
| JP | 2002-324562 A | 11/2002 |
| JP | 2003-512711 A | 4/2003 |
| JP | 2005-094914 A | 4/2005 |
| WO | WO/01/28804 | 4/2001 |
| WO | WO/01/34424 | 5/2001 |

OTHER PUBLICATIONS

International Search Authority/JP, International Search Report, mailed Dec. 11, 2007 PCT/JP2007/067352.

* cited by examiner

Primary Examiner — Javaid Nasri (74) Attorney, Agent, or Firm — Kenyon & Kenyon LLP

(57) ABSTRACT

A fuel cell system is provided with a fuel cell, an electric storage device, and a controller which determines a directed drive amount for a drive device. In the case where a drive request is input during a low-efficiency drive period in which power is supplied from the electric storage device, the directed drive amount after power generation by the fuel cell is begun is restrained. This arrangement allows a driving state to be smoothly changed even when power supply to the drive device is changed from power supply using the electric storage device alone to that using both the fuel cell and the electric storage device.

11 Claims, 9 Drawing Sheets

STOICHIOMETRIC CHARACTERISTIC FOR NORMAL DRIVE

| AIR VOLUME Q | Q0 | Q1 | Q2 | Q3 | Q4 | Q5 | Q6 | Q7 | Q8 | Q9 | Q10 |
|---|---|---|---|---|---|---|---|---|---|---|---|
| CURRENT AMOUNT I | 0 | 10 | 20 | 30 | 40 | 50 | 60 | 70 | 80 | 90 | 100 |

RELIEF STOICHIOMETRIC CHARACTERISTIC

| AIR VOLUME Q | Q0 | Q1 | Q2 | Q3 | Q4 | Q5 | Q6 | Q7 | Q8 | Q9 | Q10 |
|---|---|---|---|---|---|---|---|---|---|---|---|
| CURRENT AMOUNT I | 0 | 5 | 10 | 15 | 20 | 25 | 30 | 35 | 40 | 45 | 50 |

FIG.10

FUEL CELL SYSTEM AND MOBILE BODY

This is a 371 national phase application of PCT/JP2007/067352 filed 30 Aug. 2007, claiming priority to Japanese Patent Application No. JP 2006-238140 filed 1 Sep. 2006, the contents of which are incorporated herein by reference.

TECHNICAL FIELD

The present invention relates to a fuel cell system and more particularly to a technique for preventing the drive state of a drive device from significantly changing, depending on whether a fuel cell is generating power or not.

BACKGROUND ART

As a fuel cell system equipped with an electric storage device as an auxiliary power source of a fuel cell, there has been known one disclosed in, for example, the publication of Japanese Patent Application Laid-Open No. H09-231991. This publication discloses a fuel cell system applied to an automobile, which is a mobile body. According to the invention disclosed in the publication, when the system is started, a warm-up operation, which expedites heat generation, is performed by operating the fuel cell at low efficiency, and during the warm-up operation period, power is supplied to a motor serving as a drive device from a secondary cell, which is an electric storage device. While the secondary cell is supplying power to the motor, a warm-up state detecting means detects the warm-up state of the fuel cell during the warm-up period. If it is determined from the result of the detection that the fuel cell has been sufficiently warmed up, then the fuel cell and the motor is electrically connected so as to supply power to the motor from the fuel cell. According to the system, the fuel cell and the motor are connected after sufficient warming up is detected, thus advantageously restraining a voltage drop caused by a low temperature of the fuel cell.

DISCLOSURE OF INVENTION

However, as described above, when the drive device is driven by the power from the electric storage device during the low-efficiency operation, electrically connecting the fuel cell and the drive device after the completion of the low-efficiency operation has been posing a possibility that the drive state of the drive device suddenly changes, leading to impaired stability of the drive state.

More specifically, the output power capacity of the fuel cell is larger than the power capacity of the auxiliary electric storage device. Therefore, the amount of the drive power supplied to the drive device suddenly increases at the instant the fuel cell, which has finished the low-efficiency operation, is connected to the drive device, inconveniently resulting in impaired stability of the drive state.

In the case where the aforesaid fuel cell system is applied to an automobile, there has been a possibility of an extremely uncomfortable ride of the automobile because of an unstable traveling state of the automobile after the fuel cell is connected to the motor.

Accordingly, an object of the present invention is to provide a fuel cell system which is capable of providing a smooth change in a drive state even immediately after the power supply to a drive device from a fuel cell is started, and a mobile body.

To this end, a fuel cell system in accordance with the present invention is characterized in that when the power supply source that supplies power to the drive device is changed at an end of the low-efficiency drive, a drive amount directed to the drive device is restrained.

With the aforesaid configuration, when power supply to the drive device is started from a new power supply source, the drive amount for the drive device is restrained, thus making it possible to prevent the drive state of the drive device from becoming unstable owing to a sudden increase in the drive amount due to a sudden increase in supplied power.

Here, the term "to restrain" means to output a drive amount of a lower value than that in a case where no restriction is applied, and may include changing a drive amount at a changing rate which is smaller than that in the case where no restriction is applied. Specifically, the term "to restrain" means to converge a drive amount to an unrestrained value by gradually reducing a restrained amount after outputting the drive amount of a value which is smaller than that in the case where no restriction is applied.

Further, the term "to change a power supply source" includes a case where power is supplied from other one or more power supply sources in place of power supply from one or more particular power supply sources or a case where power is supplied from other one or more power supply sources in addition to one or more particular power supply sources.

Specifically, the present invention is characterized by being provided with a power supply source selecting means which selects a power supply source which supplies power to the drive device, a directed drive amount calculating means which calculates the drive amount to be directed to the drive device on the basis of the power supplied by the selected power supply source, and a restraining means which restrains a directed drive amount.

With the aforesaid configuration, a power supply source which supplies power to the drive device can be selected, so that the amount of power supplied according to the type and the number of a power supply source involved in the power supply differs and the drive amount to be directed to the drive device should be changed accordingly; however, the restraining means restrains a drive amount to be calculated, that is, sets a low initial value of the drive amount and then gradually increases the value, thus making it possible to prevent the drive state of the drive device from becoming unstable due to a sudden change in the drive state.

Specifically, the aforesaid plurality of power supply sources is a fuel cell and an electric storage device, and when power is supplied from the fuel cell in addition to the power supplied by the electric storage device, the drive amount to be directed to the drive device after supplying power from the fuel cell is restrained.

According to the aforesaid construction, even in a case where power can be supplied from a fuel cell having a relatively high output in addition to the power supplied from the electric storage device to the drive device, the drive amount to be directed to the drive device is restrained and gradually changed from a low value. This makes it possible to prevent the drive state of the drive device from becoming unstable.

According to the present invention, in the case where power can be supplied from a fuel cell during a low-efficiency drive period in which power is supplied from the electric storage device, the drive amount to be directed to the drive device is restrained.

With the aforesaid configuration, even in the case where power supply from the fuel cell becomes possible in a state, such as a low-efficiency operation mode, in which power is supplied only from the electric storage device and no power is substantially supplied from the fuel cell to the drive device, the drive amount for the drive device is restrained, thus making it possible to prevent the drive state of the drive device from becoming unstable.

Here, the aforesaid restraining means restrains a required system power amount after a power generation from the fuel cell is begun as a factor that changes the directed drive amount.

With the aforesaid configuration, in the case where the directed drive amount is calculated on the basis of a required system power amount (power), a change in the directed drive amount can be eased by restraining the required system power.

The aforesaid restraining means restrains a stoichiometric characteristic, which defines the relationship between a gas flow amount and a permissible power amount of the power generation of the fuel cell which should be allowed with respect to the gas flow amount after the power generation from the fuel cell is begun, as a factor for changing a directed drive amount.

According to the aforesaid configuration, in the case where the directed drive amount is calculated on the basis of the stoichiometric characteristic, a change in the directed drive amount can be eased by restraining the stoichiometric characteristic.

As a further specific configuration, a hybrid fuel cell system in accordance with the present invention is provided with a drive torque calculating means which calculates torque required for the drive device according to a drive request signal, a required drive power calculating means which calculates a required drive power amount based on the torque, an auxiliary device loss power calculating means which calculates an auxiliary device loss amount, a required system power calculating means which calculates a required system power amount on the basis of the required drive power amount and the auxiliary device loss, a gas supply amount directing means which outputs a directed gas supply amount to the fuel cell on the basis of the required system power amount, an allowed fuel cell generating power specifying means which specifies the amount of power allowed to be generated by fuel cell which may be allowed for the fuel cell on the basis of the flow amount of a gas actually supplied according to the directed gas supply amount, a minimum value selecting means which outputs the required system power amount or the allowed fuel cell generating power amount, whichever is smaller, and an allowed drive power calculating means which calculates an allowed drive power amount to be allowed for the drive device on the basis of the selected power amount and a power amount which can be supplied from the electric storage device. Further, in the case where a drive request signal is input during the low-efficiency drive period in which power is supplied from the electric storage device, the allowed drive power amount to be allowed for the drive device is restrained after the power generation from the fuel cell is begun.

The aforesaid configuration may further include a required drive power restraining means which restrains the required drive power amount in the low-efficiency drive period to a value which is not more than a difference obtained by subtracting the auxiliary device loss from a power amount which can be supplied from the electric storage device, regardless of the magnitude of a required drive amount based on the drive request signal.

The aforesaid configuration may further include a required system power restraining means which restrains the required system power amount after the power generation from the fuel cell is begun.

The aforesaid configuration may further include a stoichiometry changing means which retains a stoichiometric characteristic which defines the relationship between a gas flow amount and an allowed fuel cell generating power amount to be allowed in relation to the gas flow amount, which is referred to by the allowed fuel cell generating power specifying means to determine the amount of power allowed to be generated by fuel cell, and restrains the stoichiometric characteristic used after the power generation from the fuel cell is started.

Further, the present invention is also a mobile body equipped with any of the hybrid fuel cell systems described above. Here, "a mobile body" refers to an object constructed to be mobile by a drive device, and includes a vehicle which has a motor as a drive device and moves on wheels, and also an object which moves by converting the power generated by a drive device into propelling power. The concept of the mobile body here includes vessels traveling on water, submersible vessels traveling in water, flight vehicles traveling in the air, and space ships traveling in outer space.

BEST MODE FOR CARRYING OUT THE INVENTION

The following will explain preferred embodiments of the present invention with reference to the accompanying drawings.

(Explanation of Principle)

Figure 1:
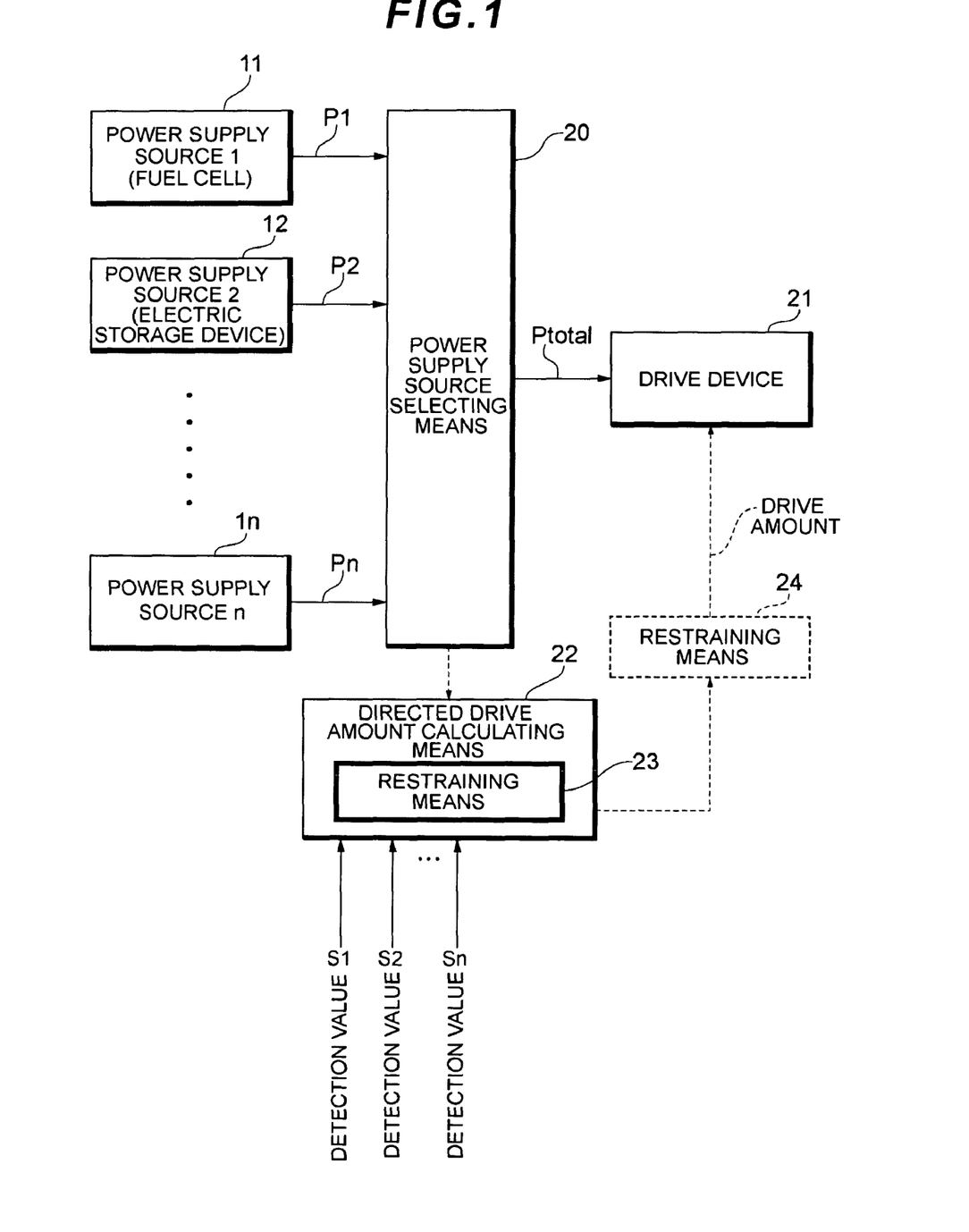
FIG. 1: It is a block diagram explaining the principle of the present invention.

FIG. 1 is a block diagram explaining the principle of the present invention.

As illustrated in FIG. 1, a fuel cell system in accordance with the present invention is equipped with a plurality of (n pieces) of power supply sources 11, 12, . . . , and 1*n*, each of which is constructed to be capable of supplying power to a drive device 21. For example, a fuel cell and an electric storage device, which is an auxiliary power source, may be power supply sources. As illustrated in FIG. 1, a power supply source 1 may be a fuel cell and a power supply source 2 may be an electric storage device. There is no limitation on the number of the power supply sources, and power can be supplied to the drive device 21 from three or more power supply sources.

The drive device 21 is a device which consumes power supplied from one or more power supply sources and may be said to be a consumption device. The drive device 21 operates from a drive amount based on a directed drive amount, which is a controlled variable. More specifically, the drive device 21 is constructed to consume power based on a directed drive amount regardless of the magnitude of a power amount supplied from a power supply source. For instance, in the case where the fuel cell system is applied to an automobile, a vehicle traveling motor or another auxiliary device may be used as the drive device 21.

Further, the fuel cell system is equipped with a power supply source selecting means 20, a directed drive amount calculating means 22, and a restraining means 23 or 24. These means are mainly functional blocks which are functionally implemented by a computer device which executes a software program for implementing a power control method according to the present invention.

The power supply source selecting means 20 is a functional block which selects power supply sources supplying power to the drive device 21 from among a plurality of power supply sources $1x$ ($1<x<n$). A plurality of power supply sources may be selected at the same time. For example, in a system wherein power is supplied to the drive device 21 from a power supply source through the intermediary of a converter or an inverter, the converter or the inverter controlled by the aforesaid computer corresponds to a part of the power supply source selecting means 20. A maximum of a total power Ptotal from a power supply source which has been allowed to supply power source can be supplied to the drive device 21 from the power supply source selecting means 20. However, an actual drive amount of the drive device 21 is limited by the directed drive amount.

A directed drive amount calculating means 22 is a functional block which calculates a drive amount to be directed to the drive device 21 on the basis of one or more obtained detection values $S1, S2, \ldots, Sn$ influencing the operating state of the fuel cell system. Calculation elements include detection signals supplied from sensors and control signals or state signals supplied from another computer device.

The restraining means 23 or 24 is a functional block which restrains the directed drive amount. The restraining means 23 functions to ease a sudden change in drive amount by restraining a drive amount. For example, when the power supply source selecting means 20 changes the power supply source $1x$ which supplies power to the drive device 21, a drive amount which is smaller than a drive amount based on the total power Ptotal is specified by adding limitation on a change in drive amount instead of specifying a drive amount based on the total power Ptotal which can be supplied from the new power supply source $1x$, and the drive amount is linearly increased. A drive amount specified immediately before the power supply source $1x$ is changed preferably changes smoothly so as to ensure smooth continuance of drive amounts specified before and after the change of the power supply source and to ensure that the drive amount linearly changes after changing the power supply source. The restraining means 23 or 24 will make the drive amount to be output to the drive device 21 track (converge) to a drive amount based on the total power Ptotal over certain time. In other words, the restraining means 23 or 24 may be said to be a function which adds a significant restriction amount immediately after a change of a power supply source to reduce a restriction amount as time elapses.

The restraining means described above may be built in a variety of forms into a system. For example, a restraining means may be applied to the case where the restraining means is built in the directed drive amount calculating means 22, as illustrated with the restraining means 23, or the case where a restraining means is used to manipulate a drive amount to be output to the drive device 21, as illustrated with the restraining means 24.

The restraining means 23 is a functional block for easing a change in a drive amount specified to the drive device 21 by limiting a change in a control parameter incurred in the process of calculating a drive amount. More specifically, the restraining means 23 provides the same function as that provided by incorporating an integration element in a control system by limiting a change amount or a change rate of a control parameter without using a control parameter calculated from the configuration of an updated power supply source $1x$. Various types of such a control parameter can be set according to a system. For instance, in a fuel cell system built in an automobile, a required system power amount after the power generation from the fuel cell is begun or a stoichiometric characteristic which defines the relationship between a gas flow amount and an allowed fuel cell generating power amount to be allowed in relation to the gas flow amount may be the control parameters to be restrained; it is needless to say, however, that the control parameters are not limited thereto.

The restraining means 24 is a functional block which eases a change in a drive amount by directly manipulating a drive amount to be directed to the drive device 21. Adding a restriction on a drive amount output by the directed drive amount calculating means 22 or on a change rate of the drive amount enables the restraining means 24 to provide the same function as that provided by incorporating an integration element in the control system.

As is obvious from the above explanation of the principle, according to the present invention, the provision of the restraining means restrains a sudden change in a control variable, and a drive amount for the drive device is gradually changed even when a power supply state changes, thus making it possible to prevent the drive state of the drive device from becoming unstable due to a sudden change in drive amount.

The following will explain a fuel cell system in accordance with the present invention in terms of embodiments in which the fuel cell system in accordance with the present invention is installed in an electric car, which is a mobile body. However, the present invention is not limited to these embodiments, but can be implemented in a variety of modifications.

First Embodiment

The present first embodiment relates to an example wherein an allowed drive power, which is a drive amount to be directed by limiting a required system power amount, is limited as the aforesaid control parameter.

(System Configuration)

Figure 2:
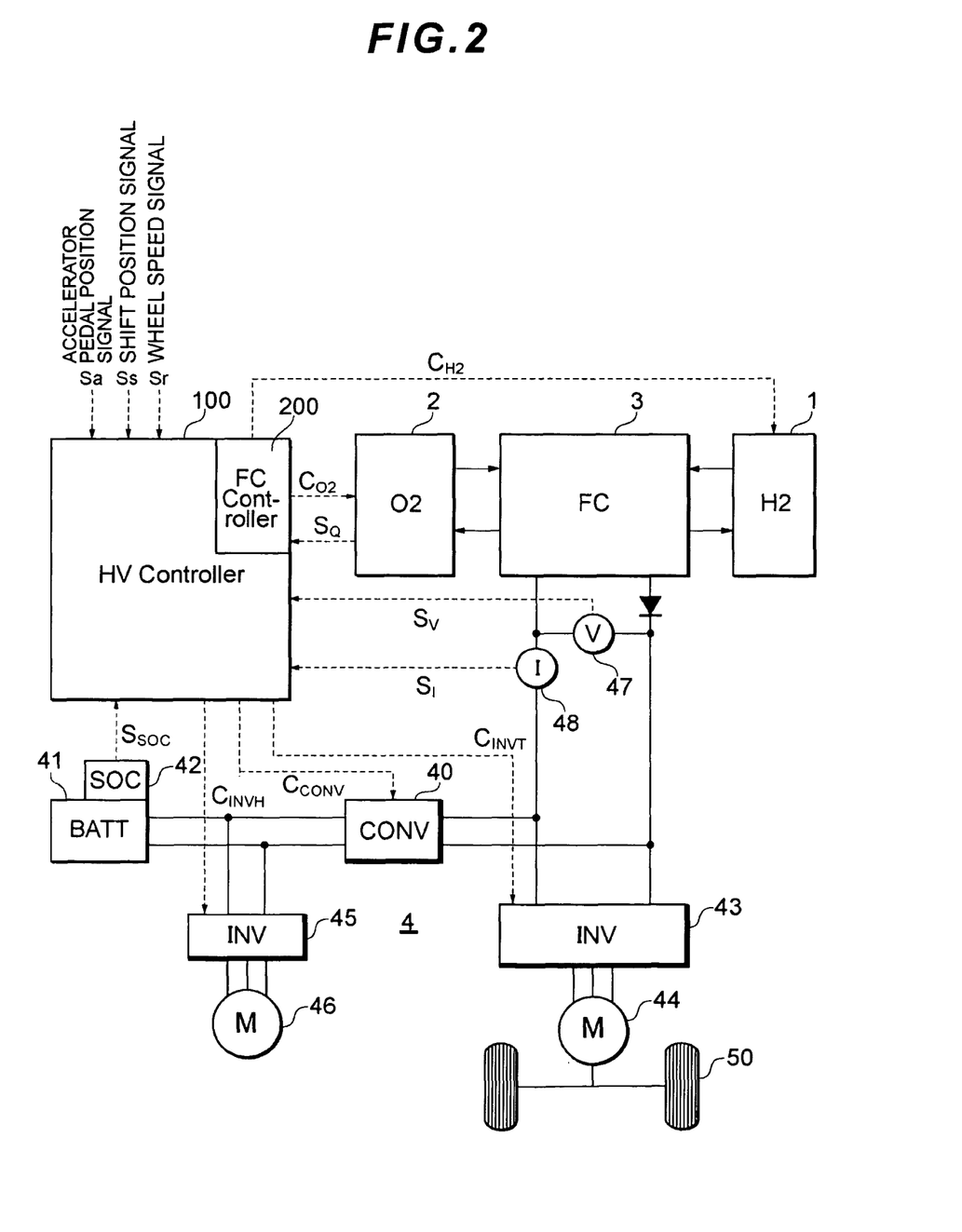
FIG. 2: It is a system configuration diagram of a hybrid fuel cell system according to a first embodiment.

FIG. 2 illustrates a system configuration diagram of a fuel cell system applied to an automobile in the present embodiment.

As illustrated in FIG. 2, the fuel cell system is equipped with a fuel gas supply system 1, an oxidized gas supply system 2, a fuel cell 3, a power system 4, a hybrid controller 100, and a fuel cell controller 200.

The fuel gas supply system 1 is a system which supplies hydrogen gas as a fuel gas to the fuel cell 3. There are no restrictions on the configuration of the fuel gas supply system 1, however, in the case, for example, where a hydrogen gas is supplied from a hydrogen tank or a hydrogen storing alloy, the system is provided with various shutoff valves, regulators, a hydrogen pump, and the like. The system may be configured such that a hydrogen gas is supplied from a reformer. A fuel off gas discharged from the fuel cell 3 is released through the intermediary of a purge shutoff valve or the like.

The oxidized gas supply system 2 is a system which supplies air as an oxidized gas to the fuel cell 3. The oxidized gas supply system 2 has no restrictions on the configuration thereof, and it is equipped with, for example, an air cleaner, a compressor, a humidifier, and the like.

The fuel cell 3 may adopt an arbitrary power generation method and there are no particular restrictions on the method or construction thereof. In the present embodiment, the fuel cell 3 is constructed of a stack of laminated single cells. The single cell is composed of MEA (Membrane Electrode Assembly) having two electrodes, namely, an anode and a cathode, which sandwich a polyelectrolyte membrane, and a separator partitions single cells. The separator provides a passage of a hydrogen gas, which is a fuel gas, air, which is an oxidized gas, and cooling water. In the MEA, the anode has an anode catalyst layer provided on a porous support layer, and a cathode has a cathode catalyst layer provided on a porous support layer. A fuel cell is adapted to provoke a backward reaction of water electrolysis; therefore, a hydrogen gas, which is a fuel gas, is supplied from the fuel gas supply system 1 to the anode, while air, which is an oxidized gas, is supplied from the oxidized gas supply system 2 to the cathode. The fuel cell 3 generates a predetermined high voltage (e.g., about 500V) between an anode electrode and a cathode electrode, which are output terminals, by connecting the single cells in series, and supplies the generated predetermined high voltage to the power system 4.

In addition, although not illustrated, the fuel cell 3 is provided with a cooling system which circularly supplies a coolant to the fuel cell 3.

The power system 4 is equipped with a DC-DC converter 40, a battery 41, a battery computer 42, a traction inverter 43, a traction motor 44, an auxiliary inverter 45, an auxiliary motor 46, a voltage sensor 47, a current sensor 48, and wheels 50. The power system 4 has no restrictions on the connecting method or components thereof and may have any construction as long as it is capable of supplying power as a fuel cell system.

The DC-DC converter 40 is a device which exchange power between different supply voltage systems. In the present embodiment, a voltage (e.g., 500V) of a primary (the fuel cell 3) is stepped down to a voltage (e.g., 200V) of a secondary (the battery 41), or a voltage of the secondary is boosted to a voltage of the primary. For example, the DC-DC converter 40 has a circuit configuration as a three-phase bridge converter. The three-phase bridge converter is constructed of, for example, a switching element, such as an IGBT (Insulated Gate Bipolar Transistor), and an inductor, and combines a circuit section similar to an inverter which temporarily converts an input DC voltage into an AC and a section which rectifies the AC back into a different DC voltage. Further, the DC-DC converter 40 sinusoidally changes an output voltage of the primary on the basis of a control signal $S_{conv}$ from the hybrid controller 100, thus making it possible to superimpose a sine wave for measuring AC impedance over a power source.

The battery 41 corresponds to an electric storage device in the present invention. The battery 41 is constructed of multiple stacks of battery modules of, for example, nickel hydride or the like, and capable of supplying power at a predetermined voltage (e.g., 200V) or charging excess power. More specifically, in the hybrid fuel cell system, if a required system electric power (power) required in the system exceeds electric power (power) which can be output from the fuel cell 3, then the battery 41 supplements the deficient power. Further, if an electric car decelerates and the traction motor 44 generates regenerative power or if the amount of generated power of the fuel cell 3 exceeds required system power, providing excess power, then the regenerative power or the excess power can be charged.

The battery computer 42 is connected to an output terminal of the battery 41 and constructed so as to permit control to maintain the state of charge (SOC) of the battery 41 to an appropriate range. For instance, discharge is carried out to supply power to supplement a deficiency in power in a high load mode at acceleration or the like, while regenerative power produced by regenerative braking is charged at deceleration. The battery computer 42 detects a voltage, a temperature, a current, an atmospheric temperature, and the like of each single cell constituting the battery 41, integrates discharge/charge amount of the battery 41 and outputs the result in the form of a detection signal $S_{SOC}$ indicating a charge state to the hybrid controller 100.

The traction inverter 43 is equipped with a circuit configuration of a voltage type PWM inverter having a switching element, such as an IGBT, for example, and converts a DC current supplied from the primary of the power system 4 on the basis of a specified torque value supplied from the hybrid controller 100 into a three-phase AC current of a predetermined amplitude and supplies the obtained three-phase AC current to the traction motor 44, which is a main machine, at the time of acceleration. Further, at the time of deceleration, three-phase AC regenerative power supplied from the traction motor 44 can be converted into a DC current corresponding thereto and then supplied to the battery 41.

The traction motor 44 is a so-called AC synchronous motor, and adapted to generate torque based on a DC current supplied as a three-phase AC from the traction inverter 43 at the time of acceleration and convert the generated torque into rotational energy of the wheels 50. At the time of deceleration, the torque of the wheels 50 is converted into electric energy to generate regenerative power thereby to impart a regenerative braking force to the wheels 50.

The auxiliary inverter 45 causes AC power to be generated from the DC power of the secondary of the DC-DC converter 40, and supplies the generated AC power to the auxiliary motor 46. The auxiliary motor 46 represents auxiliary device driven by a low-voltage system supply voltage of the secondary of the DC-DC converter 40. The auxiliary motor 46 may be, for example, a hydrogen pump which supplies a fuel gas or a compressor which supplies an oxidized gas, or a coolant pump which circulates a coolant.

A voltage sensor 47 detects an output voltage of the fuel cell 3 and outputs the detected output voltage as a detection signal SV. The current sensor 48 detects an output current of the fuel cell and outputs the detected output current as a detection signal SI. These detected voltage and the detected current are used to measure the impedance of the fuel cell 3 and to grasp the amount of retained water.

The hybrid controller 100 is a publicly known computer system, such as an ECU (Electric Control Unit), and equipped with a CPU (Central Processing Unit), a RAM, a ROM, and an interface circuit, which are not illustrated. The CPU executes software programs stored in the ROM or the like one by one thereby to permit hybrid control based on the combined use of the power of the fuel cell 3 and the power of the battery 41.

The hybrid controller 100 receives various types of detection signals for measuring an operating state and a traveling state of the electric car from a plurality of sensors, which are not illustrated. For example, the operating state of an accelerator (gas) pedal stepped on by a driver is detected by an accelerator (gas) pedal position sensor, which is not illustrated, and input as an accelerator (gas) pedal position signal Sa. Further, the shift position of a shift lever is detected by a shift position sensor and input as a shift position signal Ss. Further, the revolution speed of the traction motor 44 is detected by a wheel speed sensor provided for the wheels 50 and input as a wheel speed signal Sr.

The fuel cell controller 200 is a computer system which is independent of the hybrid controller 100 and adapted to control the drive amount of the fuel gas supply system 1 relative to the hydrogen pump and the opening/closing of valves or the like so as to control the operating state of the fuel cell 3. Further, the fuel cell controller 200 indicates the revolution speed of a compressor of the oxidized gas supply system 2 and is capable of controlling the supply amount of an oxidized gas.

The present embodiment has the configuration wherein the hybrid controller 100 performing the hybrid control and the fuel cell controller 200 controlling the fuel cell independently carry out their control from each other; however, the control configuration is not limited thereto. Alternatively, the whole system may operate as a single controller, or similar control may be accomplished by mutual communication among further divided computer systems.

(Configurations of Functional Blocks)

Figure 3:
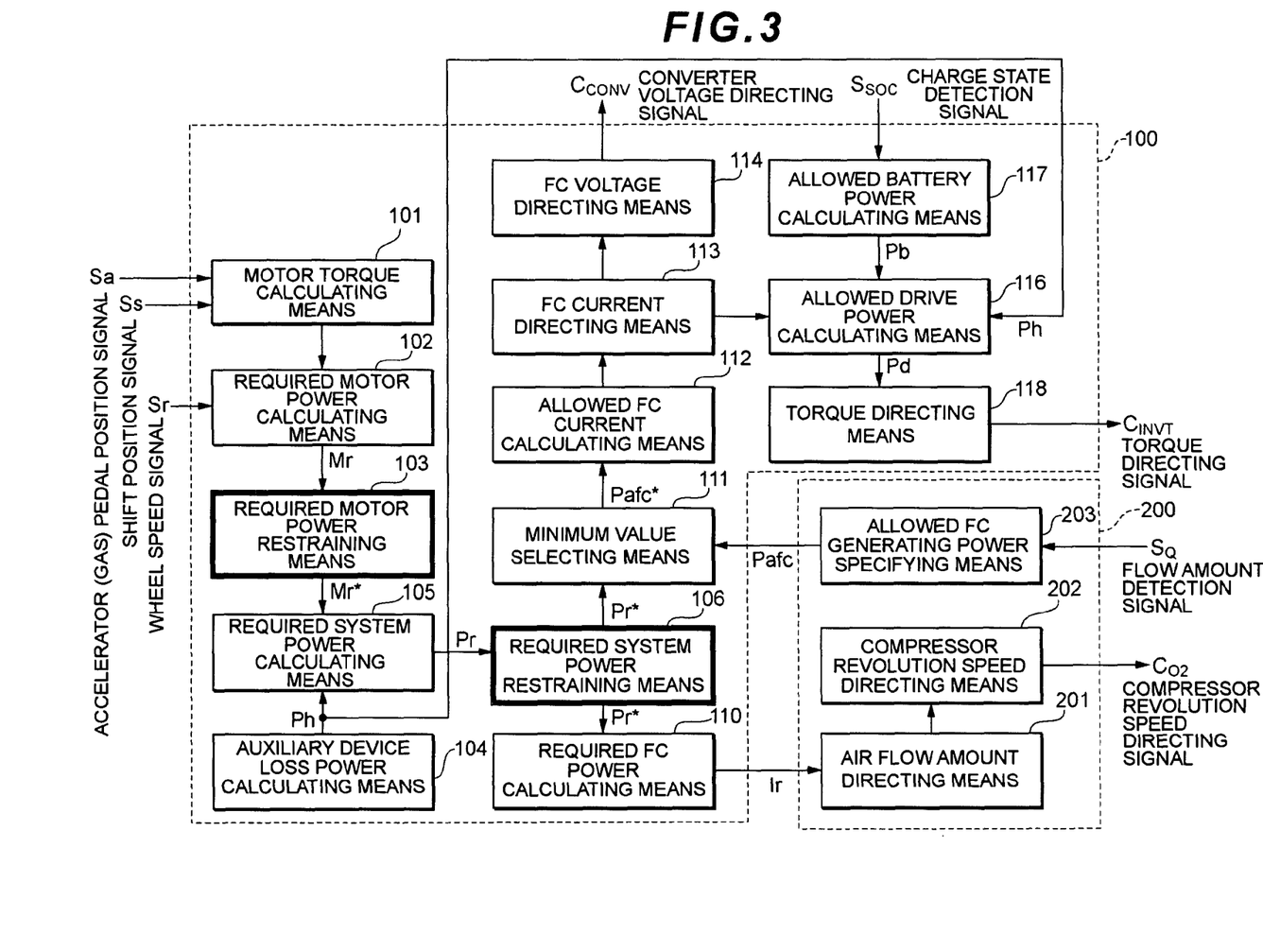
FIG. 3: It is a functional block diagram of the first embodiment.

FIG. 3 illustrates functional blocks implemented by the hybrid controller 100 and the fuel cell controller 200.

As illustrated in FIG. 3, the hybrid controller 100, as a functional block, is equipped with a motor torque calculating means 101, a required motor power calculating means 102, a required motor power restraining means 103, an auxiliary device loss power calculating means 104, a required system power calculating means 105, a required system power restraining means 106, a required FC power calculating means 110, a minimum value selecting means 111, an allowed fuel cell current calculating means 112, a fuel cell current directing means 113, a fuel cell voltage specifying means 114, an allowed drive power calculating means 116, an allowed battery power calculating means 117, and a torque directing means 118. The fuel cell controller 200 is equipped with an air flow amount directing means 201, a compressor revolution speed directing means 202, and an allowed fuel cell generating power specifying means 203.

In the hybrid controller 100, the motor torque calculating means 101 is a functional block which receives the accelerator (gas) pedal position signal Sa and the shift position signal Ss, which are drive request signals, then calculates torque required for the traction motor 44, which is a drive device, according to the drive request indicated by the signals. The required motor power calculating means 102 multiplies the calculated torque by the motor revolution speed grasped on the basis of the wheel speed signal Sr, thereby calculating required motor power Mr, which is a required drive power amount.

The required motor power restraining means 103 is a functional block related to the present invention, and it adds a limit on the required motor power Mr and then outputs restrained required motor power Mr*. The required motor power restraining means 103 is a functional block which functions during a low-efficiency drive period in which the system is operated from the power supplied from the battery 41, and which is unnecessary for normal operation. This will be described in detail hereinafter.

The auxiliary device loss power calculating means 104 is a functional block which sums up the losses incurred in the auxiliary motor 46 and the like and then outputs an auxiliary device loss Ph. Losses in addition to that of the auxiliary motor 46 include the losses incurred in, for example, the DC-DC converter 40, the traction inverter 43, and the auxiliary inverter 45.

The required system power calculating means 105 is a functional block which calculates the required system power Pr on the basis of the required motor power Mr (or the restrained required motor power Mr*) and the auxiliary device loss Ph. To be simple, the required motor power Mr (or the restrained required motor power Mr*) and the auxiliary device loss Ph are summed up. A required system power Pr denotes a required power amount currently required by the whole fuel cell system.

The required system power restraining means 106 corresponds to a restraining means in the present invention and it is a functional block which adds a limit to the required system power Pr and then outputs the restrained required system power Pr*. More detailed description will be given hereinafter.

The required fuel cell power calculating means 110 is a functional block which calculates a required system current amount Ir, which should be specified to the fuel cell 3, on the basis of the required system power Pr (or the restrained required system power Pr*).

In the fuel cell controller 200, the air flow amount directing means 201 is a functional block which determines and outputs an air flow amount for generating required system current amount Ir. The compressor revolution speed directing means 202 is a functional block which calculates the revolution speed of the compressor required to supply a directed air flow amount to the fuel cell 3 and outputs the calculated revolution speed as a compressor revolution speed directing signal $C_{O2}$ to the compressor of the oxidized gas supply system 2. The specified gas supply amount to the fuel cell 3 on the basis of the required system power Pr is determined by the air flow amount directing means 201 and the compressor revolution speed directing means 202. Although not shown, in the oxidized gas supply system 2, the air compressor rotates at a directed revolution speed, supplying air to the fuel cell 3. An actual air flow amount is detected by an air flowmeter and input to the fuel cell controller 200 as a flow detection signal $S_Q$.

In the fuel cell controller 200, the allowed fuel cell generating power specifying means 203 is a functional block which grasps an air flow amount actually supplied according to a compressor revolution speed command on the basis of the flow detection signal $S_Q$. Further, based on the air flow amount, an allowed fuel cell generating power Pafc allowable for the fuel cell 3 is specified. This is because air which contains an oxidized gas is also a material for an electrochemical reaction in the fuel cell 3 and an actual air flow amount influences the amount of generated power. To be specific, the allowed fuel cell generating power specifying means 203 determines a current amount which can be allowed for the fuel cell 3 from an air flow amount.

In the hybrid controller 100, the minimum value selecting means 111 is a functional block which compares the allowed fuel cell generating power Pafc and the required system power Pr (or the restrained required system power Pr*) input from the fuel cell controller 200, then selects a smaller power amount and outputs the selected smaller power amount. If the required system power Pr is smaller than the allowed fuel cell generating power Pafc, it means that the power currently required is less than the power which can be generated in the fuel cell 3, so that outputting the required system power Pr which is smaller will be adequate. Conversely, if the allowed fuel cell generating power Pafc is smaller than the required system power Pr, it means that less power can be generated in the fuel cell 3, so that power which can be actually generated has to be directed for power generation even when the system requires larger power. Hence, the allowed power Pafc* output from the minimum value selecting means 111 defines the power amount to be directed to the fuel cell 3 at the present time.

The allowed fuel cell current calculating means 112 is a functional block which calculates an allowed current amount of the fuel cell corresponding to the allowed power Pafc*. The fuel cell current directing means 113 is a functional block which outputs a directed current value for the fuel cell 3. The fuel cell voltage directing means 114 is a functional block which determines an operating point defined from the required system power Pr (or the restrained required system power Pr*) and an I-V (output current-output voltage) characteristic of the fuel cell 3, and outputs a voltage value at the operating point as a converter voltage directing signal $C_{VONV}$. The fuel cell 3 allows the operating point to be changed by controlling an output voltage, so that a desired output current of the fuel cell can be obtained by adjusting a primary voltage of the DC-DC converter 40.

Figure 4:
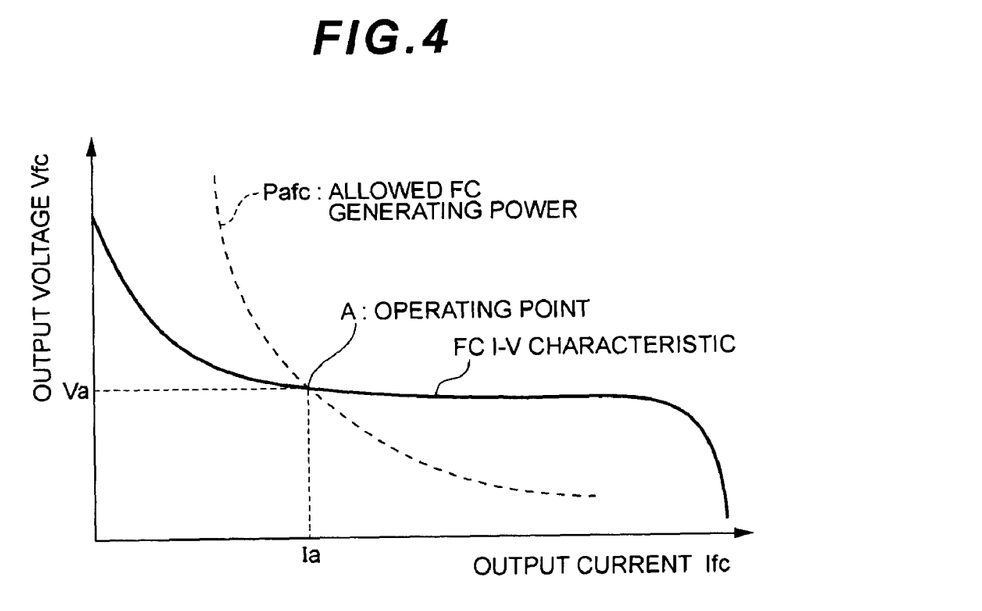
FIG. 4: It is an explanatory diagram of an I-V characteristic and an operating point of a fuel cell.

FIG. 4 illustrates a relationship between an I-V characteristic and an operating point A of the fuel cell.

As illustrated in FIG. 4, when the allowed generating power Pafc for allowing the fuel cell to generate power is determined, the operating point A is determined from an intersection point of a power supply curve and the I-V characteristic, and an output current and an output voltage of the fuel cell are determined. In the present embodiment, a current value Ia to be directed first is determined, so that a primary voltage Va to be directed to the DC-DC converter 40 is determined from the current value Ia and the I-V characteristic.

In FIG. 3, a directed current value for the fuel cell 3 is output also to the allowed drive power calculating means 116. The allowed drive power calculating means 116 is a functional block which calculates allowed drive power Pd that may be currently supplied to the traction inverter 43 on the basis of allowed battery power Pb, a directed current value, and the auxiliary device loss power Ph input from an allowed battery power calculating means 117. A torque directing means 118 is a functional block which determines torque to be generated at the traction motor 44 on the basis of the allowed drive power Pd and outputs the determined torque as a torque command signal $C_{INVT}$ to the traction inverter 43.

The allowed battery power calculating means 117 is a functional block which calculates the allowed battery power Pb which can be output from the battery 41 on the basis of a charge state detection signal $S_{SOC}$ supplied from the battery computer 42.

(Configuration and Operation Related to the Low-Efficiency Drive Period)

The configuration related to a low-efficiency drive period, which is another feature of the present invention, will now be described.

The low-efficiency drive period refers to a period in which the fuel cell needs a warm-up operation at starting or the like of the fuel cell system or the power generation of the fuel cell must be suspended. This period is a battery-traveling period during which the electric car is driven by supplying power from the battery 41.

In the present invention, the required motor power restraining means 103 appropriately restrains the required motor power Mr. Further, a means for restraining an increase in power described in the explanation of the principle is provided to prevent a sudden increase in torque to the traction motor 44 when the power generation of the fuel cell is started immediately after the end of the low-efficiency drive period. In the first embodiment, the required system power restraining means 106 corresponds to the power increase restraining means, and in the second embodiment, easing the stoichiometric characteristic when specifying allowed generating power from an air flow amount corresponds thereto.

<Restraining Required Motor Power>

In FIG. 3, the required motor power restraining means 103 restrains the required motor power during the low-efficiency drive period to not more than a difference obtained by subtracting the auxiliary device loss Ph from the power amount Pb which can be supplied from the battery 41 (Mr*≦Pb−Ph), regardless of the magnitude of a drive request to the traction motor 44 based on the accelerator (gas) pedal position signal Sa or the shift position signal $S_S$. The restrained required motor power Mr* eventually becomes the allowed drive power Pd calculated by the allowed drive power calculating means 116.

Figure 5:
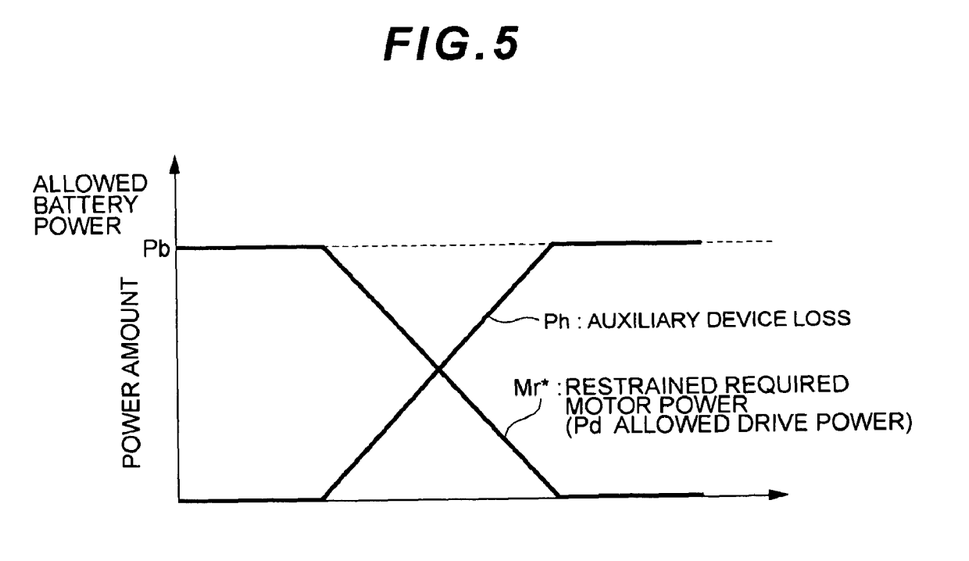
FIG. 5: It is a diagram illustrating a relationship between allowed battery power and restrained required motor power.

FIG. 5 illustrates the relationship between the allowed battery power Pb and the restrained required motor power Mr*.

As illustrated in FIG. 5, the allowed drive power Pb which can be supplied to the traction motor 44 in the low-efficiency drive period is a remaining amount obtained by subtracting the auxiliary device loss Ph from the allowed battery power Pb which can be supplied by the battery 41. If required motor power which cannot be actually supplied in the low-efficiency drive period is appropriated, the power which can be actually output for a specified allowed drive power will eventually be deficient. For this reason, restriction is placed on the required motor power Mr by the required motor power restraining means 103 so as to provide virtually allowable power.

Figure 6:
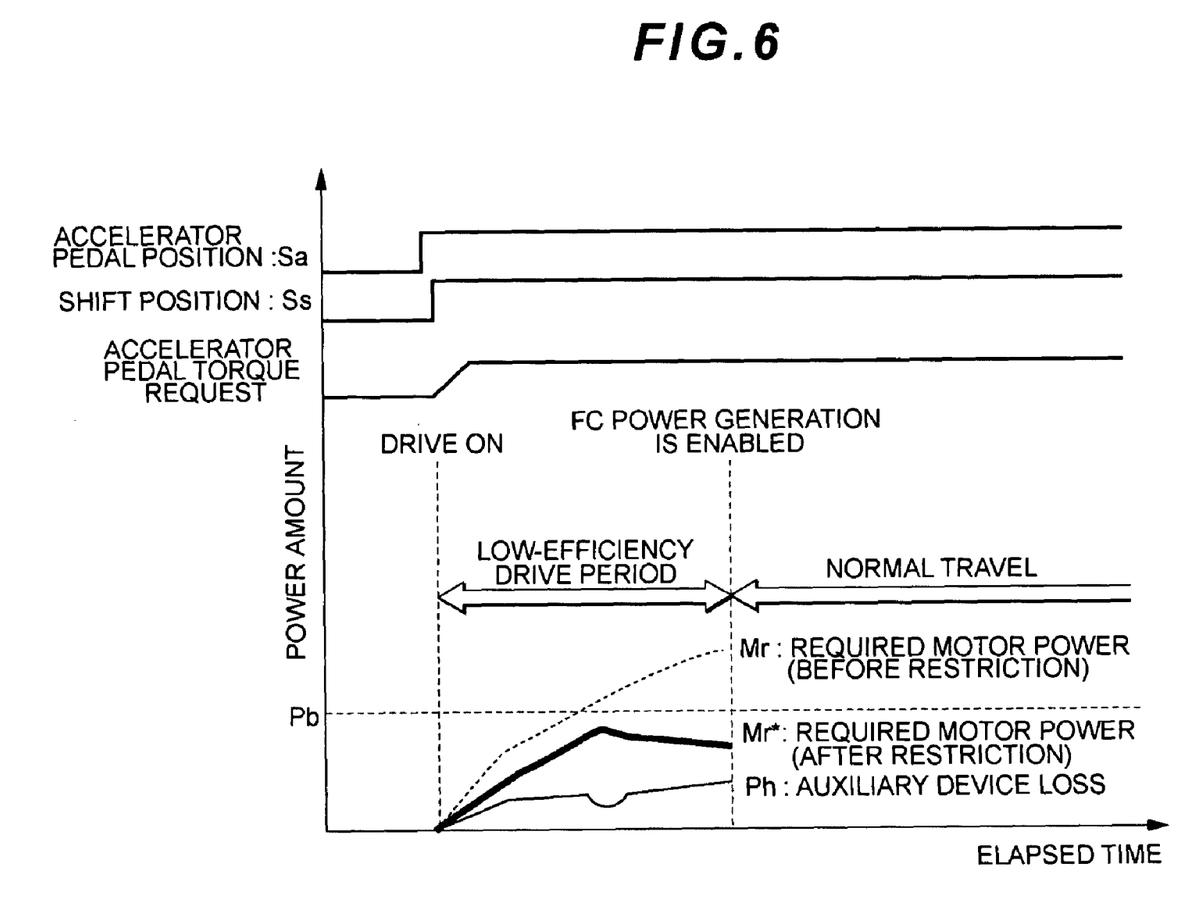
FIG. 6: It is a diagram illustrating transitions of required motor power before being limited and restrained required motor power during a low-efficiency drive period.

FIG. 6 compares a case where a required motor power is restricted (Mr*) and a case where the required motor power is not restricted (Mr) in the low-efficiency drive period.

When the accelerator (gas) pedal is depressed, the accelerator (gas) pedal position signal Sa based on the opening degree of the accelerator (gas) pedal is input. Further, when a shift lever is set to "R", "D" or "B," then the shift position signal Ss indicating the shift position is input. Accordingly, an accelerator (gas) pedal torque request is output from the motor torque calculating means 101. Independently of the magnitude of the actual required motor power Mr, the required motor power restraining means 103 adds a restriction based on the auxiliary device loss Ph to the required motor power Mr according to the correspondence relationship illustrated in FIG. 5, and outputs the result as the restrained required motor power Mr*.

As illustrated in FIG. 6, in the case where the required motor power Mr is small and the auxiliary device loss Ph is also small, the restriction amount is small, but as the required motor power Mr increases, the ratio of the auxiliary device loss Ph in relation to the allowed battery power Pb increases, and the required motor power becomes to be restrained to the required motor power Mr* of not more than the remaining amount obtained by subtracting the auxiliary device loss Ph from the allowed battery power Pb.

<Restraining the Required System Power>

In FIG. 3, if the accelerator (gas) pedal position signal Sa or the shift position signal Ss is input to request for the drive of the traction motor 44 during the low-efficiency drive period, then the required system power restraining means 106 places a certain restriction on a normal required system power Pr output by the required system power calculating means 105 rather than directly outputting the value of the normal required system power Pr after the power generation from the fuel cell 3 is begun. More specifically, a value which is smaller than the normal required system power Pr is output, and then the value is gradually increased to approximate to the normal required system power Pr.

Figure 7:
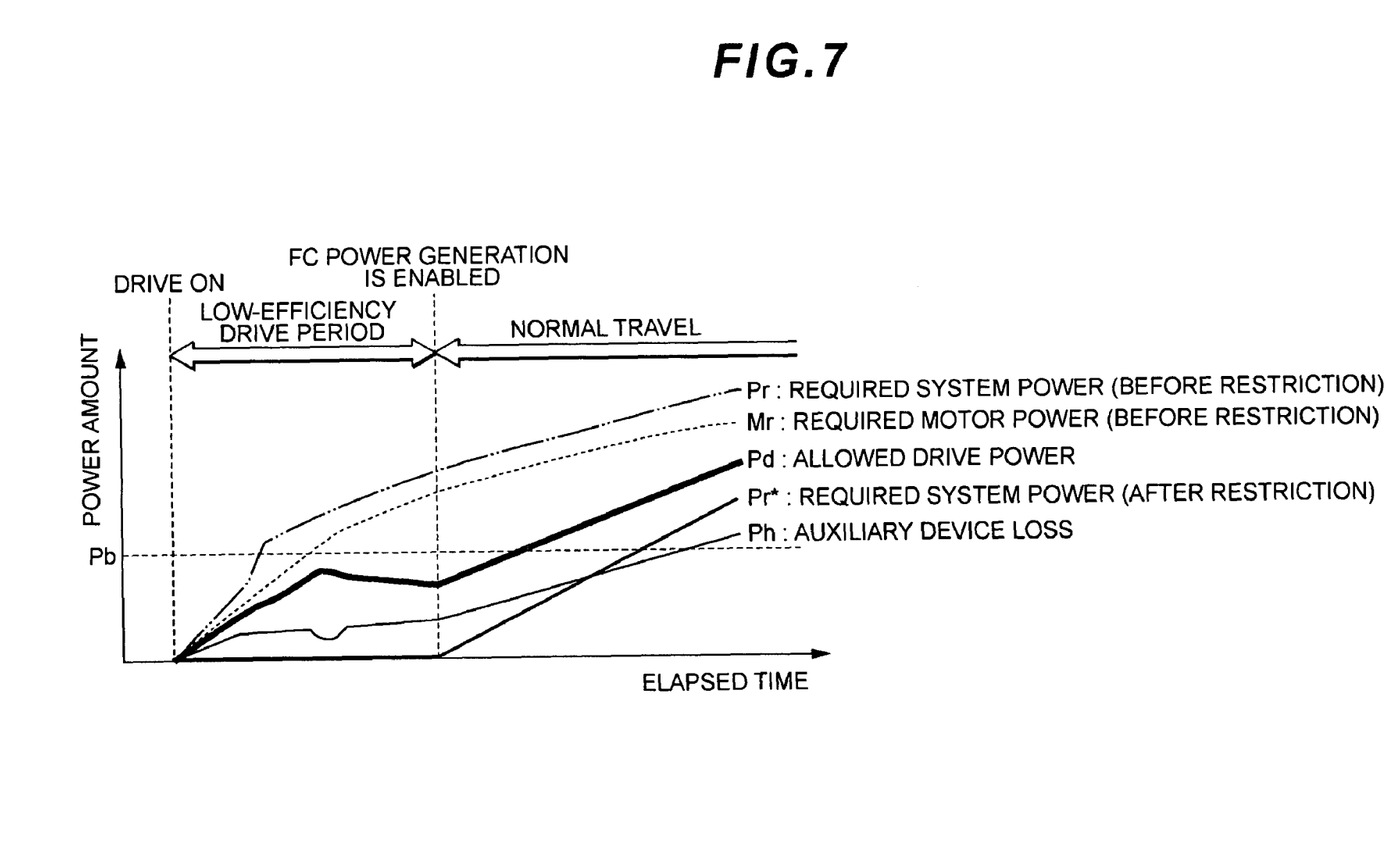
FIG. 7: It is a diagram illustrating a transition of a restrained required system power during the low-efficiency drive period and immediately following the low-efficiency drive period.

FIG. 7 illustrates the normal required system power Pr output by the required system power calculating means 105 and the restrained required system power Pr* output by the required system power restraining means 106.

The normal required system power Pr before the restriction corresponds to the normally required power amount of the entire system according to an operation of the accelerator (gas) pedal or the shift lever from and during the low-efficiency drive period. However, during the low-efficiency drive period, the restrained required system power Pr* is maintained at a fixed value (zero in the present embodiment) and controlled so as to gradually increase from the start of the power generation of the fuel cell 3. The restrained required system power Pr* normally converges to the normal required system power.

The setting of the changing characteristic of the restrained required system power Pr* or the time required to eventually converge to a value of the normal required system power Pr may be arbitrarily changed. An increase in the restrained required system power eventually appears in the form of an increase in the allowed drive power Pd. An increase amount of the restrained required system power Pr* may be controlled to an extent where an increase in the allowed drive power Pd does not cause a sudden torque change, which makes the driver or a passenger in the electric car feel uncomfortable.

Further, the restrained required system power Pr* may be linearly increased, as illustrated in FIG. 7, although not limited thereto. Further, control may be conducted such that, if the restrained required system power Pr* approximates to a certain range from the normal required system power Pr, the restriction on the required system power is terminated. Alternatively, the restriction on the required system power may be cleared if the operation state of the accelerator (gas) pedal or the shift lever is changed with a resultant change in a required drive amount. The restriction on the required system power may be cleared in a range where the driver or a passenger in the electric car does not feel uncomfortable due to a sudden torque change.

Advantages in The First Embodiment

The first embodiment described above provides the following advantages.
1) According to the first embodiment, the required system power influencing the allowed drive power Pd is separated from the original computed value Pr and output in a smaller value as the restrained value Pr* and then the restrained value Pr* is gradually increased, thus making it possible to restrain a sudden change in a drive state.
2) According to the first embodiment, a required motor power is estimated in a range of power which can be output from the battery 41 in the low-efficiency drive period, so that it is possible to prevent temporary torque deficiency of the motor with respect to a drive request.
3) According to the first embodiment, the traction motor 44 does not incur a sudden torque change, thus making it possible to prevent a driver or a passenger from feeling uncomfortable. Further, a required system power to be limited at the beginning is gradually converged, so that a required torque amount can be quickly recovered by the control for an appropriate gradual increase.

Second Embodiment

A second embodiment relates to an example wherein allowed drive power is restrained by changing a stoichiometric characteristic.

A hybrid fuel cell system of an electric car in the second embodiment shares the same system configuration (FIG. 2) as that of the aforesaid first embodiment, so that the explanation thereof will be omitted.

Figure 8:
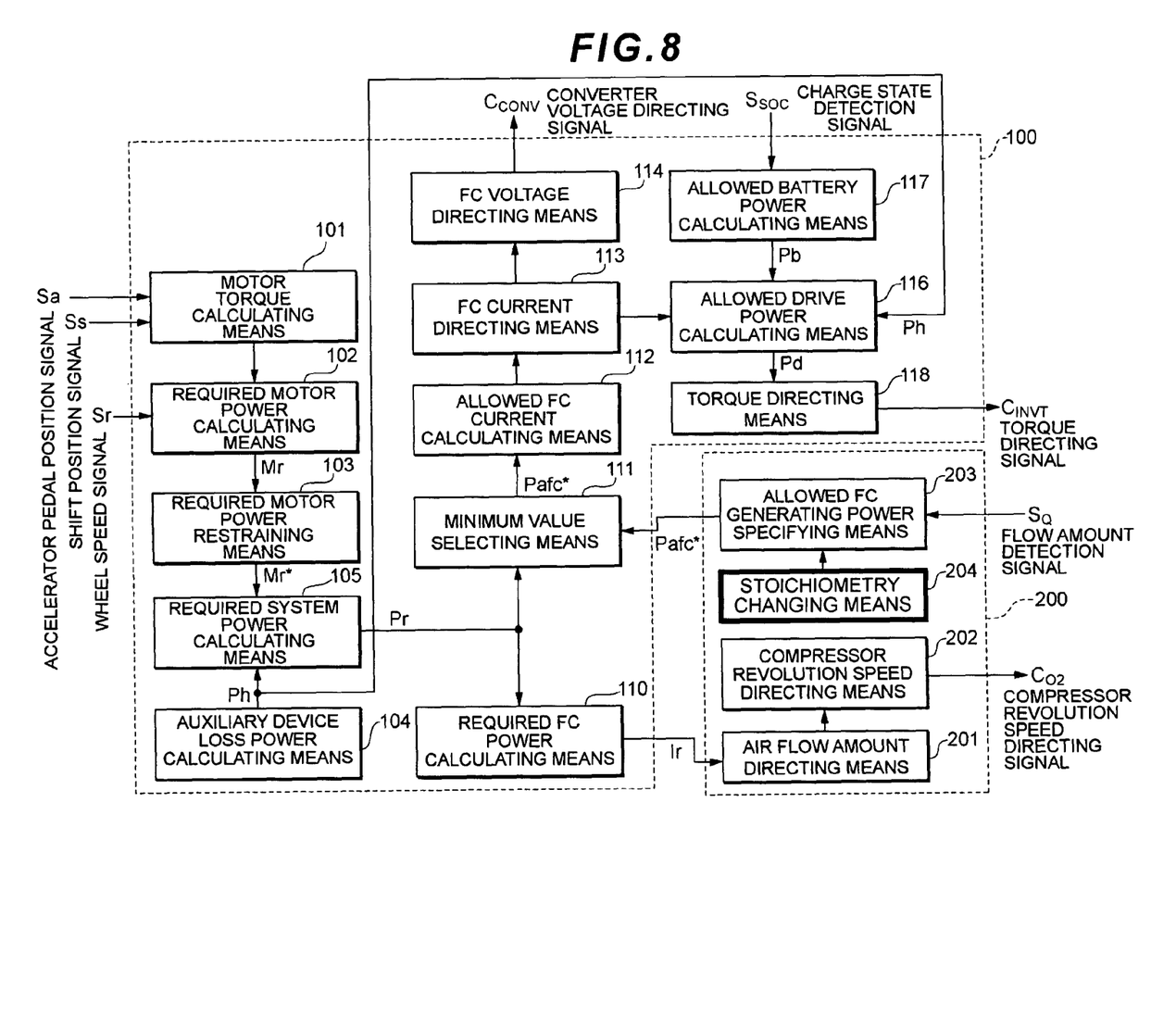
FIG. 8: It is a functional block diagram illustrating a second embodiment.

FIG. 8 illustrates a functional block implemented by a hybrid controller 100 and a fuel cell controller 200 in the second embodiment.

As illustrated in FIG. 8, the second embodiment differs from the functional block explained in the aforesaid first embodiment (FIG. 2) in that the hybrid controller 100 does not have the required system power restraining means 106 and the fuel cell controller 200 is equipped with a stoichiometry changing means 204 as a restraining means in the present invention. Other functional blocks are the same as those of the first embodiment, and the explanation thereof will be omitted.

In the case where required system power is not restrained, a minimum value selecting means 111 selects required system power Pr and inconveniently outputs large allowed drive power Pd upon the end of a low-efficiency drive period unless actual allowed power Pafc of a fuel cell specified by an allowed fuel cell generating power specifying means 203 is extremely small.

According to the second embodiment, therefore, restriction is imparted such that a power generation current amount based on an air flow amount output by the allowed fuel cell generating power specifying means 203 is reduced and control is carried out to prevent large power from being taken out at an initial stage of power generation. More specifically, the control is carried out as described below by changing a stoichiometric characteristic.

The allowed fuel cell generating power specifying means 203 estimates allowed power by using a stoichiometric characteristic for estimating an appropriate power generation current amount relative to an air flow amount input from an airflow meter. For example, in FIG. 9, a conversion table indicating the stoichiometric characteristic applied to a normal operation is used to specify a current amount I relative to an input air mass flow Q.

The stoichiometry changing means 204 separately retains a stoichiometric characteristic, which specifies the relationship between an air flow amount and an allowed fuel cell generating power which should be allowed for the air flow amount, for the normal operation and a stoichiometric characteristic for the operation at switching from the low-efficiency drive period. Further, an operation is performed such that an easing stoichiometric characteristic in which a stoichiometric ratio coefficient is set to be relatively small, as compared with the stoichiometric characteristic used for the normal operation, is utilized for a while after the low-efficiency drive period is switched to a normal drive period.

Figure 9:
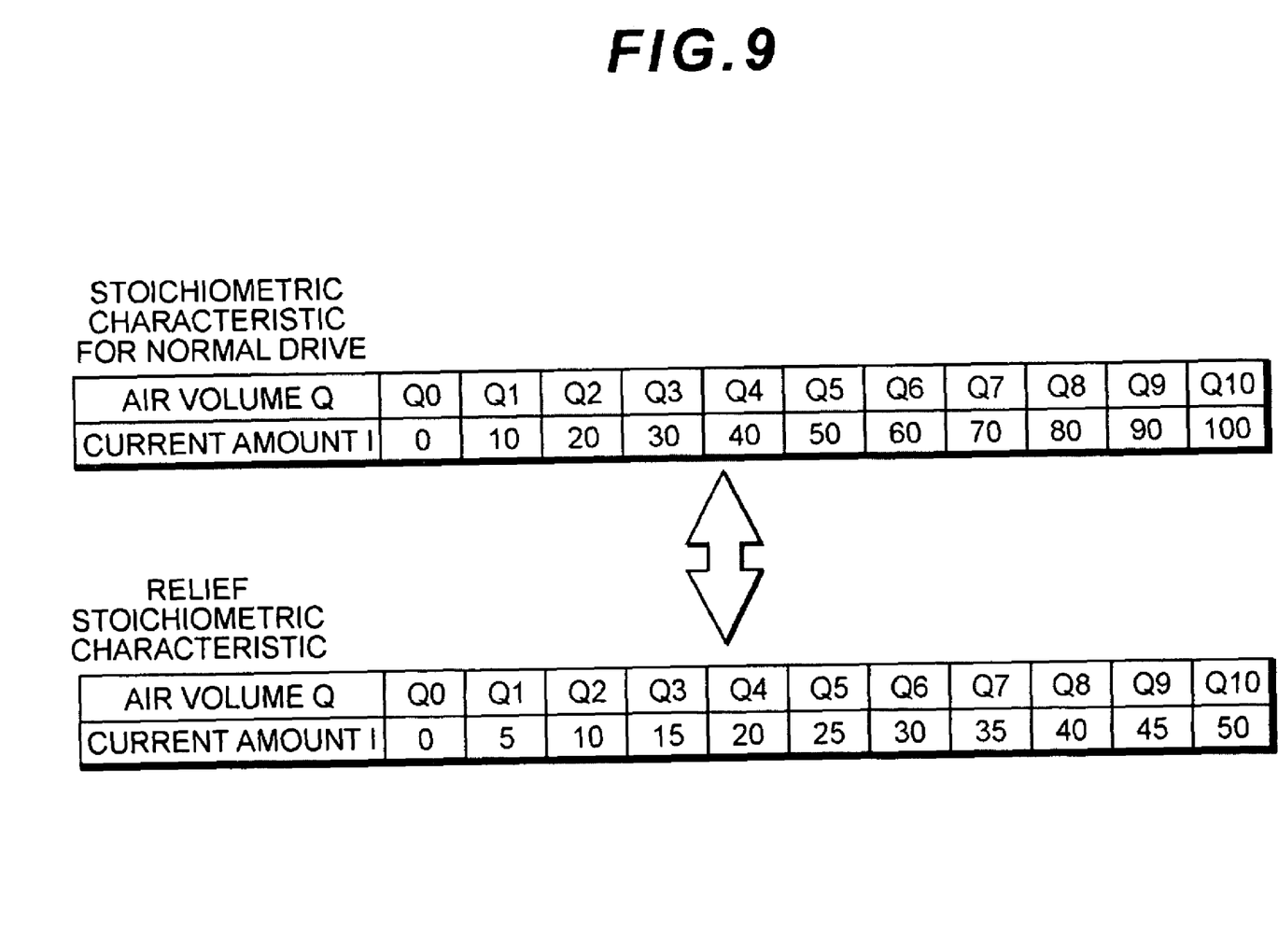
FIG. 9: It is a diagram illustrating a stoichiometric characteristic for normal drive and a relief stoichiometric characteristic.

As illustrated in FIG. 9, when a drive request is issued during the low-efficiency drive period, the stoichiometry changing means 204 decides that the stoichiometric characteristic for the normal drive would lead to a sudden change in the allowed drive power Pd, and switches to and uses the conversion table indicating the easing stoichiometric characteristic. As long as the easing stoichiometric characteristic is used, power which lower than the value of power which can be actually generated is output as the allowed fuel cell generating power Pafc*, which is an estimated value, to the hybrid controller 100; therefore, the allowed drive power Pd calculated on the basis thereof will take a small value accordingly.

The extent to which the stoichiometric ratio coefficient is changed as the easing stoichiometric characteristic is arbitrarily set, as long as a change in the amount of generated power is limited such that a change in torque which is computed and directed on the basis of a relief stoichiometric characteristic does not cause a driver or a passenger in the electric car to feel uncomfortable. In the example illustrated in FIG. 9, the setting has been made so that the stoichiometric ratio coefficient will be halved. During the low-efficiency drive period, it is unnecessary to output the allowed fuel cell generating power Pafc, so that the allowed power during the period may be set at a fixed value (zero in the present embodiment).

Figure 10:
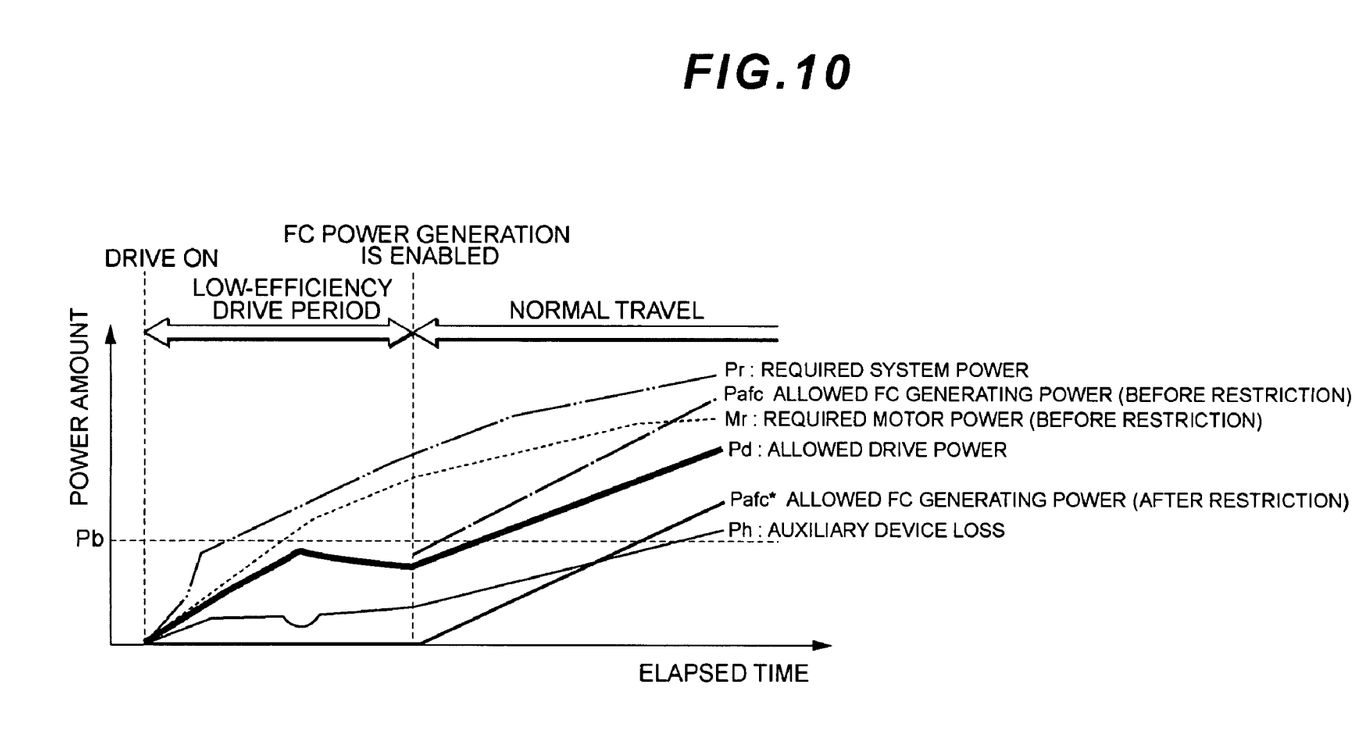
FIG. 10: It is a diagram illustrating a transition of eased allowed fuel cell power during the low-efficiency drive period and immediately following the low-efficiency drive period.

FIG. 10 illustrates the relationship between the allowed fuel cell generating power Pafc, which is obtained from the stoichiometric characteristic in a normal drive mode, and the allowed fuel cell generating power Pafc*, which is obtained from the relief stoichiometric characteristic in the present embodiment.

The fuel cell 3 has an abundant air flow amount even immediately after power generation is begun, so that the allowed power Pafc computed with a normal stoichiometric characteristic will be high from the instant immediately after the low-efficiency drive period. In contrast thereto, the eased allowed power Pafc* is calculated on the basis of the relief stoichiometric characteristic in the present embodiment, so that control is carried out to cause the allowed power to gradually increase from the start of power generation of the fuel cell 3. Hence, the allowed drive power Pd computed on the basis of the eased allowed power Pafc* also gradually increases and converges to the required motor power Mr which should be output in a proper normal drive mode.

If the allowed drive power Pd approaches to a predetermined range from the required motor power Mr calculated without restriction, then control may be carried out such that the use of the relief stoichiometric characteristic is terminated and the normal stoichiometric characteristic may be used. Further, control may be carried out to terminate the use of the relief stoichiometric characteristic if the operation state of an accelerator (gas) pedal or a shift lever is changed and a required drive amount is changed. The use of the relief stoichiometric characteristic may be stopped within a range in which a driver or a passenger in an electric car does not feel uncomfortable due to a sudden torque change.

Modification Example

The present invention is not limited to the aforesaid embodiments, but can be applied in a variety of modifications.

In the aforesaid embodiments, a sudden torque change after the end of the low-efficiency drive period has been prevented by restraining the required system power or by limiting the stoichiometric characteristic. However, the methods for preventing such a sudden torque change are not limited to those described above, and any method for eventually preventing a sudden change in a torque command to the traction motor 44 may be used.

For example, the aforesaid embodiments correspond to the restraining means 23 in the description of the principle of FIG. 1, which is adapted to limit a change in a control parameter taking place in the process of the calculation of a drive amount. Hence, a configuration may be adopted, whereby a control parameter other than the restriction of required system power or the stoichiometric characteristic is restrained.

Alternatively, a function corresponding to the restraining means 24 in the description of the principle of FIG. 1 may be provided. More specifically, similar operation and advantage are obtained also by directly restraining the allowed drive power Pd or the torque command signal $C_{INVT}$ to the traction motor 44. To be specific, control may be carried out such that the allowed drive power Pd or the torque command signal $C_{INVT}$ output immediately after the power generation of a fuel cell is allowed is temporarily set at a low value (e.g., zero) and then linearly increased until converged over a predetermined period to a value of the allowed drive power Pd or the torque command signal $C_{INVT}$ obtained when no restriction is applied.

INDUSTRIAL APPLICABILITY

The fuel cell system in accordance with the present invention restrains a sudden change in a drive amount for a drive device when power supply from a fuel cell becomes possible, thus making it possible to restrain the drive state of the system from becoming unstable due to a sudden change therein.

According to a mobile body equipped with the fuel cell system in accordance with the present invention, a sudden change in a drive state in the case where a drive device is a traction motor is restrained, so that it is possible to protect a passenger from feeling uncomfortable.

The invention claimed is:

1. A fuel cell system configured to allow at least one of a plurality of power supply sources, including a fuel cell and an electric storage device, to supply power to a drive device and configured to carry out low-efficiency drive to supply power from the electric storage device, wherein, when the power supply source that supplies power to the drive device is changed at an end of the low-efficiency drive, a drive amount directed to the drive device is linearly changed to a first drive amount from a second drive amount, the second drive amount being smaller than the first drive amount corresponding to power that can be supplied from the changed power supply source.

2. The fuel cell system according to claim 1, comprising:

a power supply source selecting device that selects a power supply source supplying a power to the drive device;

a specified drive amount calculating device that calculates the drive amount to be directed to the drive device on a basis of the power supplied by the selected power supply source; and a restraining device that restrains the directed drive amount.

3. The fuel cell system according to claim 2, wherein the plurality of power supply sources is the fuel cell and the electric storage device, and the drive amount to be directed to the drive device after power is supplied from the fuel cell is restrained when power is supplied from the fuel cell in addition to the power supplied by the electric storage device.

4. The fuel cell system according to claim 3, wherein in a case where power supply from the fuel cell becomes possible during a period of the low-efficiency drive in which power is supplied from the electric storage device, the drive amount to be directed to the drive device is restrained.

5. The fuel cell system according to claim 4, wherein the restraining device restrains a required system power amount after a power generation from the fuel cell is begun as a factor that changes the directed drive amount.

6. The fuel cell system according to claim 4, wherein the restraining device restrains a stoichiometric characteristic, which defines a relationship between a gas flow amount and an allowed fuel cell power amount which should be allowed in relation to the gas flow rate after the power generation from the fuel cell is begun as a factor that changes the directed drive amount.

7. A mobile body comprising the fuel cell system according claim 1.

8. A fuel cell system configured to comprise a fuel cell and an electric storage device and configured to carry out low-efficiency drive to supply power from the electric storage device, the fuel cell system comprising:
   a drive torque calculating device that calculates torque required for a drive device according to a drive request signal;
   a required drive power calculating device that calculates a required drive power amount based on the torque;
   an auxiliary device loss power calculating device that calculates an auxiliary device loss amount;
   a required system power calculating device that calculates a required system power amount on the basis of the required drive power amount and the auxiliary device loss;
   a gas supply amount directing device that outputs a directed gas supply amount to the fuel cell on the basis of the required system power amount;
   an allowed fuel cell generating power specifying device that specifies an allowed fuel cell generating power amount to be allowed for the fuel cell on the basis of a gas flow amount actually supplied in response to the directed gas supply amount;
   a minimum value selecting device that outputs the required system power amount or the allowed fuel cell generating power amount, whichever is smaller; and
   an allowed drive power calculating device that calculates an allowed drive power amount to be allowed for the drive device on the basis of the selected power amount and a power amount that can be supplied from the electric storage device,
   wherein, in the case where the drive request signal is input within a low-efficiency drive period during which power is supplied from the electric storage device, the allowed drive power amount to be allowed for the drive device is restrained after a power generation from the fuel cell is begun.

9. The fuel cell system according to claim 8, further comprising:
   a required drive power restraining device that restrains the required drive power amount in the low-efficiency drive period to a value that is not more than a difference obtained by subtracting the auxiliary device loss from a power amount that can be supplied from the electric storage device.

10. The fuel cell system according to claim 9, further comprising a required system power restraining device that restrains the required system power amount after the power generation from the fuel cell is begun.

11. The fuel cell system according to claim 9, wherein
   a stoichiometric characteristic which defines a relationship between the gas flow amount and an allowed fuel cell generating power amount to be allowed in relation to the gas flow amount, the relationship of which is referred to by the allowed fuel cell generating power specifying device to determine the allowed fuel cell generating power amount, is retained, and
   further comprising a stoichiometry changing device configured to restrain the stoichiometric characteristic used after a power generation from the fuel cell is started.

* * * * *